W. H. HAYTER.
WHEEL.
APPLICATION FILED FEB. 15, 1917.

1,280,999.

Patented Oct. 8, 1918.
2 SHEETS—SHEET 1.

Inventor
William H. Hayter
By Wm H B Acock & Son
Attorneys

W. H. HAYTER.
WHEEL.
APPLICATION FILED FEB. 15, 1917.
1,280,999. Patented Oct. 8, 1918.
2 SHEETS—SHEET 2.
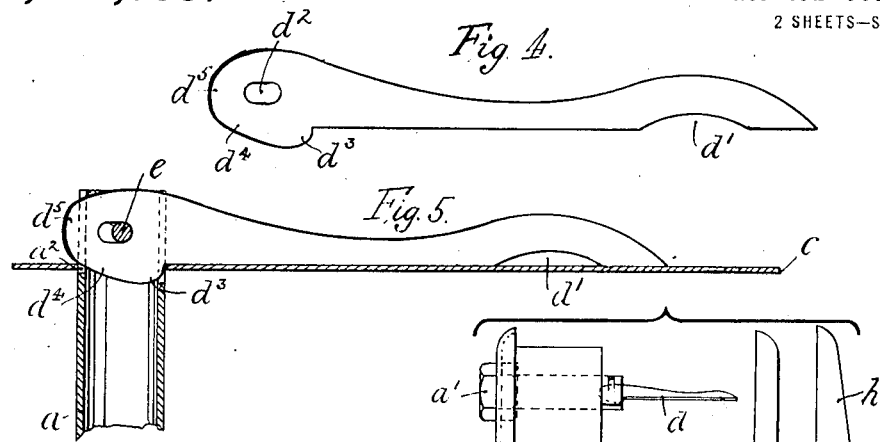
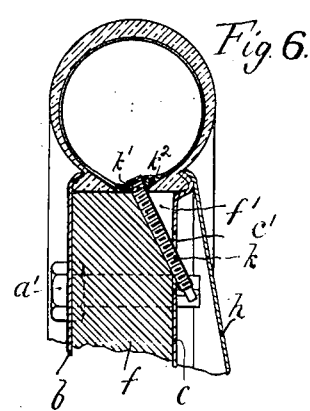
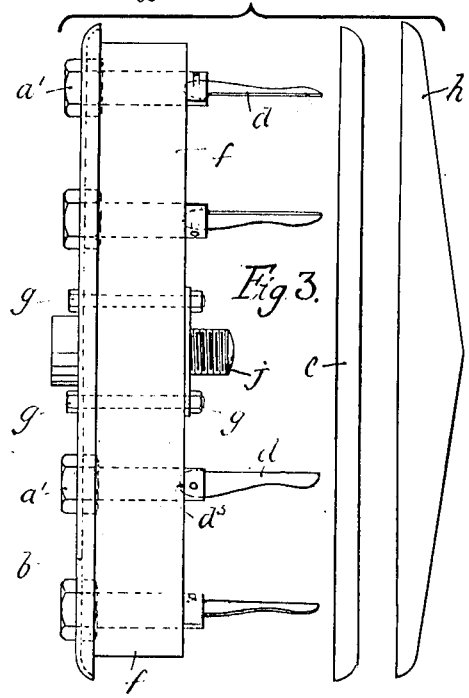
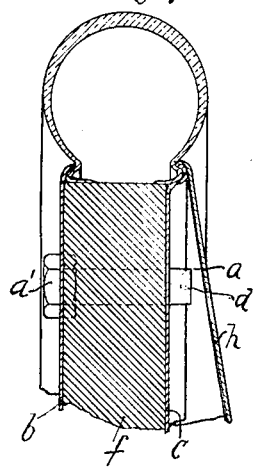
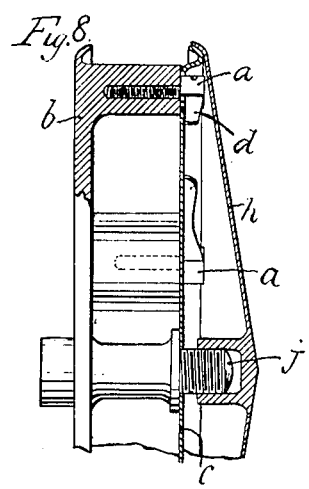
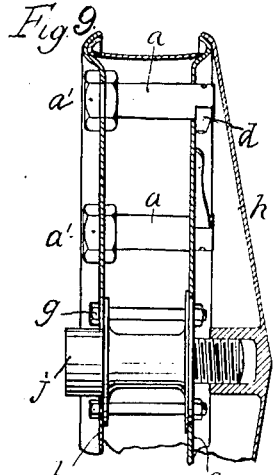
Inventor
William H. Hayter
By Wm H Babcock & Son
Attorneys.

UNITED STATES PATENT OFFICE.

WILLIAM H. HAYTER, OF SOUTH NORWOOD, LONDON, ENGLAND.

WHEEL.

1,280,999.  Specification of Letters Patent.  Patented Oct. 8, 1918.

Application filed February 15, 1917. Serial No. 148,810.

*To all whom it may concern:*

Be it known that I, WILLIAM HARRY HAYTER, subject of George V, King of Great Britain and Ireland, and residing at 27 Birchanger road, South Norwood, in the county of London, England, have invented certain new and useful Improvements in Wheels, of which the following is a specification.

This invention relates primarily to road wheels for vehicles, particularly vehicles with wheels provided with pneumatic or rubber or other resilient tires of the type having a core on which the tire takes a direct bearing and having also side flanges for retaining the tire in place. The invention has for its chief object to enable the existing tire to be taken off and replaced quickly and securely by another tire.

According to this invention, one of the said flanges is fixed to or forms part of the core while the other flange is detachably secured to the core by means of cam- or snap-levers whereby it can be rapidly removed from the core so as to enable the tire to be at once slipped on to or off the core, as the case may be.

The said flanges are preferably formed by the inturned peripheral portions of disks or plates, but in some cases the inner portions of the disks or plates are removed so as to leave the flanges in the form of rings. They may also be serrated or corrugated or otherwise suitably roughened so that they may the more effectively grip the tire.

When the wheel is to carry a pneumatic tire, the core is preferably provided with a recess, sunk in from the side carrying the detachable flange, for the accommodation of the tire valve so as to facilitate the removal and replacement of the tire. If the detachable flange is of disk- or plate-form the tire-valve is so placed in the tire tube that it can project through such disk or plate so as to be accessible for pumping purposes.

The cam- or snap-levers may be inclosed by a detachable cover-plate which serves to keep them clean and water tight; and also to conceal them.

By this invention, a faulty tire can be removed and replaced by a sound one within the space of one minute thereby rendering it unnecessary to carry the usual "spare wheel".

In order that this invention may be clearly understood and readily carried into effect, I will proceed to describe the same with reference to the accompanying drawings in which:

Fig. 3 shows the wheel ready to receive a tire, the detachable disk and cover-plate having been removed and the cam-levers having been drawn out straight ready for the detachable flange to be threaded on to them again when the tire is in place.

Fig. 4 is a side elevation of the preferred form of cam-lever.

Fig. 5 shows the cam-lever mounted on the wheel and holding the detachable disk in place.

Figure 1:
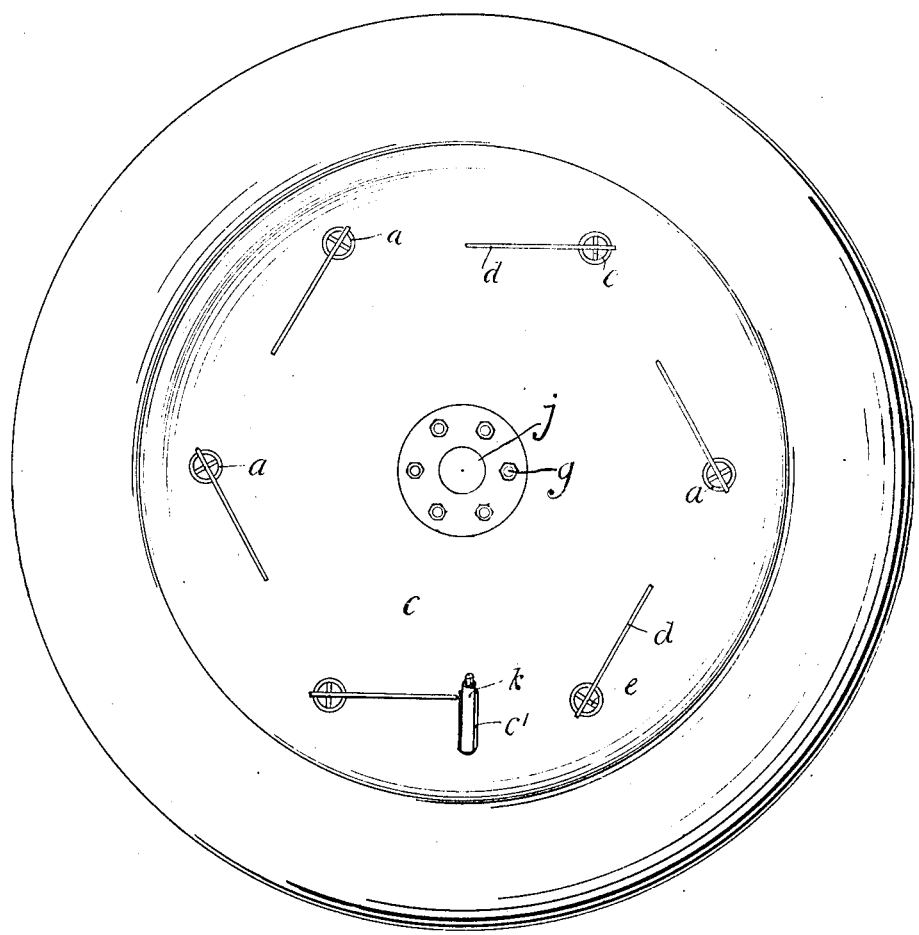
Figure 1 is a side elevation of the wheel without the cover-plate.

Fig. 6 indicates how the tire valve is disposed in the tire tube relatively to the core and the detachable disk.

Fig. 7 is a section showing a plain-edged tire fitted to the improved wheel.

Figs. 8 and 9 are sections of modified forms of wheel embodying the present improvements.

Referring more particularly to Figs. 1, 2, 3, 5, 6, 7 and 9 of the drawings, pins $a$, which may be tubular, are passed through from the disk $b$, which is fixed, to the disk $c$, which is detachable each pin having a head $a^1$ at one end and a slot $a^2$ at the other end. The cam levers, $d$, are mounted on pivots $e$ within the slots $a^2$, their longer arms being in the form of a handle and preferably provided with a depression $d^1$ to accommodate one of the operator's fingers, and their shorter arms being cam- or eccentrically-shaped, preferably as shown in Figs. 4 and 5. These cam-levers are each provided with a slot $d^2$, to facilitate their movement on their pivots. The slots $a^2$ in the pins $a$ are of such a depth as to allow the cam-levers to be swung over on their pivots.

The shape of the cam-surface of the lever should be such that it prevents the lever moving from the position shown in Fig. 5 unless an outward pull is applied to the longer arm of the lever. To this end, the under or working surface of the fulcrumed end of the lever is preferably shaped as shown in Figs. 4 and 5, that is, it is provided with a heel $d^3$ and an inclined toe $d^4$. When the lever is drawn out straight, as shown in Fig. 3, its rounded extremity $d^5$ sinks into the pin $a$, as shown in broken lines in Fig.

3. In moving the lever down from the position shown in Fig. 3 to that shown in Fig. 5, the heel $d^3$ and the toe $d^4$ press against the periphery of the hole in the plate $c$ through which passes the pin $a$, as shown in Fig. 5. The movement of the heel $d^3$ against the periphery of this hole urges the lever to the left (as seen in Fig. 5) and thereby causes the toe $d^4$ to shoot over the plate $c$. In order to cause the lever to snap tightly against the plate $c$, it is preferable to so fashion that portion of the surface of the heel that is remote from the toe that it meets the flat under surface of the lever at or about a right angle, so that just prior to the lever completing its movement toward the disk $c$ the heel sinks suddenly into the pin $a$ and the long arm of the lever snaps with a rapid movement against the disk $c$. The lever in this position of rest automatically locks itself in position and presses on the plate $c$ on opposite sides of the fulcrum $e$. In order to release it an outward pull must be applied to its longer arm.

The disk $b$ is fixed to the core $f$ in any convenient manner, as, for instance by means of bolts $g$.

In regard to the tire valve, this is accommodated in a depression $f^1$ (Fig. 6) in the core whereby it can be easily removed and projects through a slot $c^1$ (Fig. 1) in the disk $c$. The valve, by being arranged at an angle as shown in Fig. 6, renders inflation of the tire easier and quicker than formerly. If the valve is secured in place in the tube on the inner periphery of the latter, as usual, a wedge-shaped space will be left between its plate $k^1$ and the core or the bead of the tire cover; this space is preferably occupied by a correspondingly shaped washer $k^2$ of sufficient size to support the portion of the tube immediately around the valve.

Figure 2:
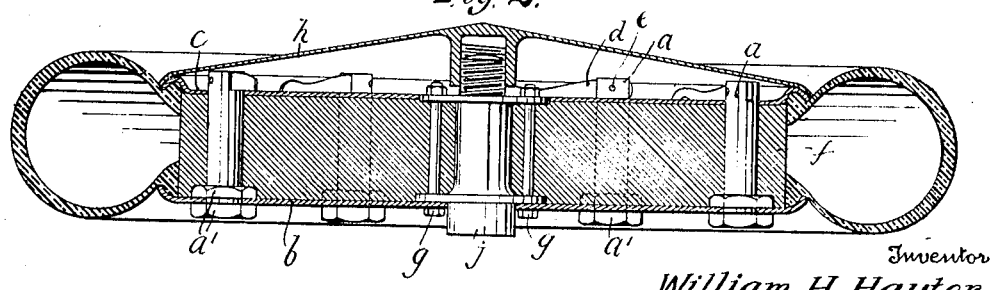
Fig. 2 is substantially a median cross section of the complete wheel.

The cover-plate $h$, besides serving to protect and conceal the cam-levers and the tire valve $k$, provides, by means of its inturned periphery, additional support for and grip on the tire. It is temporarily secured in place in any convenient manner, but preferably by means of a screwed boss, which screws on to the hub $j$, as shown in Fig. 2. Suitable means may be provided for preventing accidental unscrewing of the cover-plate although its grip on the tire is generally sufficient to prevent this. The leverage obtained between the edge of the cover-plate and the screw-thread by which it is secured in position, provides a very effective grip on the tire.

Assuming that it is desired to replace a faulty tire by a sound one, the *modus operandi* is as follows, reference being had chiefly to Fig. 3. The operator unscrews the cover-plate, pulls the longer arms of the cam-levers out at right angles to the core, and then draws off the detachable disk tire cover and tube. These operations can be performed in the space of 15 seconds. The sound tire cover and tube are now placed on the core, the detachable disk threaded on to the levers, the latter then snapped down on to the detachable disk, and the cover-plate screwed on, whereupon the wheel is again ready for use.

In order to facilitate the threading of the detachable disk on to the pins $a$ the outer ends of the latter may be made conical, and the back portion of the fulcrumed end of the lever, *i. e.*, the portion remote from the heel $d^3$ and toe $d^4$, may be used to still further facilitate the operation by pressing them backward so as to urge the detachable disk and tire home.

The said disks and cover-plate may be radially ribbed so as to increase their strength.

Tire covers having plain non-wired edges may, if desired, be employed. In such a case, they are preferably made smaller in diameter than the core so that it will be impossible for the air pressure in the tube to force the edges of the cover over the inturned edges of the disks $b$ and $c$. An example of a plain-edged tire on the wheel is shown in Fig. 7.

In Fig. 8 the disk $b$ and bed for the tire are shown cast as a single piece, the pins $a$ being screwed into the bed as illustrated. The hub $j$ may be formed integrally with the disk $b$.

In Fig. 9 the bed for the tire is fixed at one side to the disk $b$ the other side resting on the disk $c$.

In all cases, the disks $b$ and $c$ are well and closely fitted to the hub $j$ so that they transmit load pressure direct from the tire to the hub.

I claim:

1. A wheel for carrying a tire comprising a bed on which the tire takes a bearing, a tire-supporting flange fixed to one side of said bed, a detachable tire-supporting flange at the other side of said bed, parts connected to said flanges respectively, and cam-levers bearing against that one of said parts which is connected to the detachable flange for temporarily attaching the detachable tire-supporting flange to the bed, each of said levers being adapted to move endwise and provided with a cam face on its shorter arm said face being adapted to be acted on to cause such motion and also serving to clamp said flange.

2. A wheel for carrying a tire comprising a solid core on which the tire takes a bearing, a tire-supporting flange fixed to one side of said core, a detachable tire-supporting flange at the other side of said core, disks connected to said flanges respectively, and cam-levers bearing against the disk which is connected to the detachable flange to press the latter toward the fixed flange for temporarily attaching the detachable tire-supporting flange to the core.

3. A wheel for carrying a tire comprising a hub, a solid core on which the tire takes a bearing, a plate for supporting the tire fixed to one side of said core and means for fixing same to said hub, a detachable plate for supporting the tire at the other side of said core, pins secured to said fixed plate and extending through the core and the detachable plate, and cam levers carried by said pins for securing the detachable plate to the core.

4. A wheel for carrying a tire comprising a hub, a solid core on which the tire takes a bearing, a plate for supporting the tire fixed to one side of said core and means for fixing same to said hub, a detachable plate for supporting the tire at the other side of said core, pins secured to said fixed plate and extending through the core and the detachable plate, cam levers carried by said pins for securing the detachable plate to the core, and a cover-plate detachably mounted on the side of the wheel carrying the detachable tire-supporting plate.

5. A wheel for carrying a pneumatic tire comprising a bed on which the tire takes a bearing and which is provided with a recess formed in one side to accommodate the tire valve; a tire-supporting flange fixed to one side of the bed, a detachable tire-supporting flange provided with a slot for the reception of said valve at the other side of said bed, and cam-levers for temporarily attaching the detachable tire-supporting flange to the bed.

6. For use in locking the detachable tire-supporting flange of a tire-supporting wheel, a cam- or snap-lever having a heel $d^3$ and an inclined toe $d^4$, both said heel and toe being at the larger end of the lever, in combination with a slotted pin in which the said lever is mounted and a disk through which the slotted end of said pin protrudes, said disk being connected to said detachable flange, the construction being such that when the said lever is swung on a fulcrum and the heel is caused to ride over an abutment the inclined toe and heel force the said flange inward toward the wheel substantially as described.

7. A tire-carrying wheel comprising a bed on which the tire takes a bearing, a tire-supporting flange fixed to one side of said bed, a detachable tire-supporting flange at the other side of said bed and cam-levers each having a heel $d^3$ and a toe $d^4$ for temporarily attaching the detachable tire-supporting flange to the bed, means for supporting said cam levers and means for receiving the thrust of the said heels.

8. A tire-carrying wheel comprising a bed on which the tire takes a bearing, a tire-supporting flange fixed to one side of said bed, a detachable tire-supporting flange at the other side of said bed, fixed pins projecting from said bed, cam-levers mounted on said pins and arranged so as to fasten said detachable tire-supporting flange in place, each cam-lever having a heel and toe, the arrangement being such that when the cam levers are forced down against said detachable tire-supporting flange the heels of the levers cause the latter to move in an endwise direction, thereby forcing the toes of the levers into sliding engagement with said detachable tire-supporting flange and thereby holding the latter in place substantially as described.

9. A tire-carrying wheel comprising a bed on which the tire takes a bearing, a tire-supporting flange fixed to one side of said bed, a perforated detachable tire-supporting flange at the other side of said bed, fixed pins projecting from said bed and passing through the perforations in said detachable tire-supporting flange, cam-levers fulcrumed in projecting ends of said pins, said cam levers each having a slot $d^2$, a heel $d^3$ and a toe $d^4$, the arrangement being such that when said cam-levers are forced down toward said detachable tire-supporting flange their heels engage one side of the said perforations and cause the cam-levers to move in an endwise direction and thereby force the toes of said cam-levers slidingly over the other side of said perforations substantially as described.

In witness I have hereunto set my hand in the presence of two witnesses.

WILLIAM H. HAYTER.

Witnesses:
H. T. P. GEE,
GEO. VAN DYNE.